US005634153A

United States Patent [19]

Constable

[11] Patent Number: 5,634,153

[45] Date of Patent: May 27, 1997

[54] STATIC IMMUNITY FOR SINGLE TOUCH FLASH CHARGER CONTROL

[75] Inventor: Douglas W. Constable, Rochester, N.Y.

[73] Assignee: Eastman Kodak Company, Rochester, N.Y.

[21] Appl. No.: 575,658

[22] Filed: Dec. 21, 1995

Related U.S. Application Data

[60] Provisional application No. 60/001,514 Jul. 18, 1995, and provisional application No. 60/003,345, Sep. 7, 1995.

[51] Int. Cl.[6] .......................... G03B 15/05; H05B 37/00

[52] U.S. Cl. .......................... 396/206; 315/241 P

[58] Field of Search .......................... 354/413, 418, 354/127.1, 127.11, 127.12, 145.1, 149.11; 351/241 P, 241 R

[56] References Cited

U.S. PATENT DOCUMENTS

| | | | |
|---|---|---|---|
| 3,310,723 | 3/1967 | Schmidt et al. | 320/1 |
| 3,651,372 | 3/1972 | Uchida et al. | 315/134 |
| 3,764,849 | 10/1973 | Ohta | 315/241 P |
| 3,882,358 | 5/1975 | Deskevich et al. | 315/241 P |
| 4,001,640 | 1/1977 | Biber | 315/241 P |
| 4,007,469 | 2/1977 | Land et al. | 354/27 |
| 4,065,700 | 12/1977 | Liebman | 315/241 R |
| 4,067,028 | 1/1978 | Lermann et al. | 354/141 |
| 4,082,983 | 4/1978 | Adams, Jr. | 315/241 P |
| 4,084,167 | 4/1978 | Iwata | 354/33 |
| 4,130,780 | 12/1978 | Ban et al. | 315/241 P |
| 4,163,178 | 7/1979 | Hosono | 315/241 P |
| 4,259,615 | 3/1981 | Kashihara et al. | 315/241 P |
| 4,271,375 | 6/1981 | Hosono | 315/241 P |
| 4,322,143 | 3/1982 | Mailander | 354/32 |
| 4,323,822 | 4/1982 | Yakematsu | 315/241 P |
| 4,348,087 | 9/1982 | Ellin et al. | 354/139 |
| 4,511,233 | 4/1985 | Kazami et al. | 354/418 |
| 4,540,265 | 9/1985 | Harvey | 354/417 |
| 4,628,229 | 12/1986 | Inoue | 315/241 P |
| 4,777,507 | 10/1988 | Dunsmore et al. | 354/418 |
| 4,912,499 | 3/1990 | Desormeaux | 354/468 |
| 4,989,029 | 1/1991 | Inoue et al. | 354/418 |
| 4,994,846 | 2/1991 | Kobayashi et al. | 354/418 |
| 5,138,362 | 8/1992 | Kobayashi et al. | 354/418 |
| 5,249,007 | 9/1993 | Tanaka | 354/145.1 |
| 5,315,332 | 5/1994 | Hirasaki et al. | 354/149.11 |
| 5,337,099 | 8/1994 | Tasaka et al. | 354/76 |

FOREIGN PATENT DOCUMENTS

| | | | |
|---|---|---|---|
| 3-65129 | 6/1991 | Japan . | |
| 5-93951 | 4/1993 | Japan . | |
| 43525 | 2/1994 | Japan . | |
| 6-53525 | 2/1994 | Japan . | |
| 6-130469 | 5/1994 | Japan . | |
| 6-202208 | 7/1994 | Japan . | |
| 6-203987 | 7/1994 | Japan . | |
| 6-203988 | 7/1994 | Japan . | |
| 6-203989 | 7/1994 | Japan . | |
| 6-208897 | 7/1994 | Japan . | |
| 6-347872 | 12/1994 | Japan . | |
| 7-1223892 | 5/1995 | Japan . | |
| 2067032 | 11/1980 | United Kingdom | H02M 3/24 |

*Primary Examiner*—W. B. Perkey
*Attorney, Agent, or Firm*—Francis H. Boos, Jr.

[57] ABSTRACT

An electronic flash device includes an illumination element, an actuation circuit having a flash capacitor providing energy releasable to illuminate the element, and a self-oscillating charging circuit, having a transistor, for charging the capacitor. The invention is characterized by a resistor located between a base of the transistor and ground for preventing the self-oscillating circuit from charging the capacitor when the flash device is exposed to an external static electric charge.

6 Claims, 3 Drawing Sheets

STATIC IMMUNITY FOR SINGLE TOUCH FLASH CHARGER CONTROL

CROSS REFERENCE TO RELATED APPLICATION

Reference is made to and priority claimed from U.S. provisional application Ser. No. U.S. 60/001,514 and U.S. Ser. No. 60/003,345, filed 18 Jul. 1995 and 7 Sep. 1995, entitled STATIC IMMUNITY FOR SINGLE TOUCH FLASH CHARGER CONTROL.

CROSS-REFERENCE TO RELATED APPLICATIONS

This application is related to U.S. patent application Ser. No. 08/327,244 titled "Single Touch Flash Charger Control" and filed on Oct. 21, 1994 in the name of Dunsmore.

BACKGROUND OF THE INVENTION

1. Field of Invention

The invention relates to electronic flash devices having particular utility with low cost photographic cameras, and more specifically to charging and charge-control circuits for such flash devices.

2. Description of the Prior Art

The above-cited cross-referenced application discloses an electronic flash device usable in a camera. The device includes a self-oscillating charging circuit, a momentary trigger for initiating oscillations of the circuit to charge a flash capacitor, and a voltage sensing device coupled directly between the circuit and the flash capacitor for arresting the oscillations when the capacitor is fully charged. The voltage sensor includes a zener diode in series with a neon ready-light, and switches on a transistor to ground the charging circuit and arrest the oscillations when the capacitor is fully charged. Actuation of the flash device automatically restarts the oscillations and recharges the flash capacitor.

In the electronic flash device, a transistor 46 is forward biased when a switch 42 is momentarily closed, thereby starting the charger. However, a small pulse of static electricity at the base of transistor 46 will also start the charger because transistors 46 and 48 are connected in a manner that provides extremely high current gain. Thus, a problem with the electronic flash device is that an external static electric discharge to the camera can start the oscillations in the charging circuit, thereby charging the flash capacitor. For example, bringing a static charged object, such as a piece of clothing, near the camera will start the charging cycle, just as if the momentary trigger had been actuated. Such a result is undesirable because it reduces battery life.

SUMMARY OF THE INVENTION

The present invention is directed to overcoming one or more of the problems set forth above. Briefly summarized, according to one aspect of the invention, an electronic flash device includes an illumination element, an actuation circuit having a flash capacitor providing energy releasable to illuminate the element, and a self-oscillating charging circuit, having a transistor, for charging the capacitor. The invention is characterized by a resistor located between a base of the transistor and ground for preventing the self-oscillating circuit from charging the capacitor when the flash device is exposed to a static electric charge.

By preventing unintentional charging of the flash device when the device is exposed to static electricity, electrical power is conserved, thereby extending battery life in flash devices which utilize batteries.

These and other features and advantages of the invention will be more clearly understood and appreciated from a review of the following detailed description of the preferred embodiments and appended claims, and by reference to the accompanying drawings.

DESCRIPTION OF THE PREFERRED EMBODIMENTS

Figure 1:
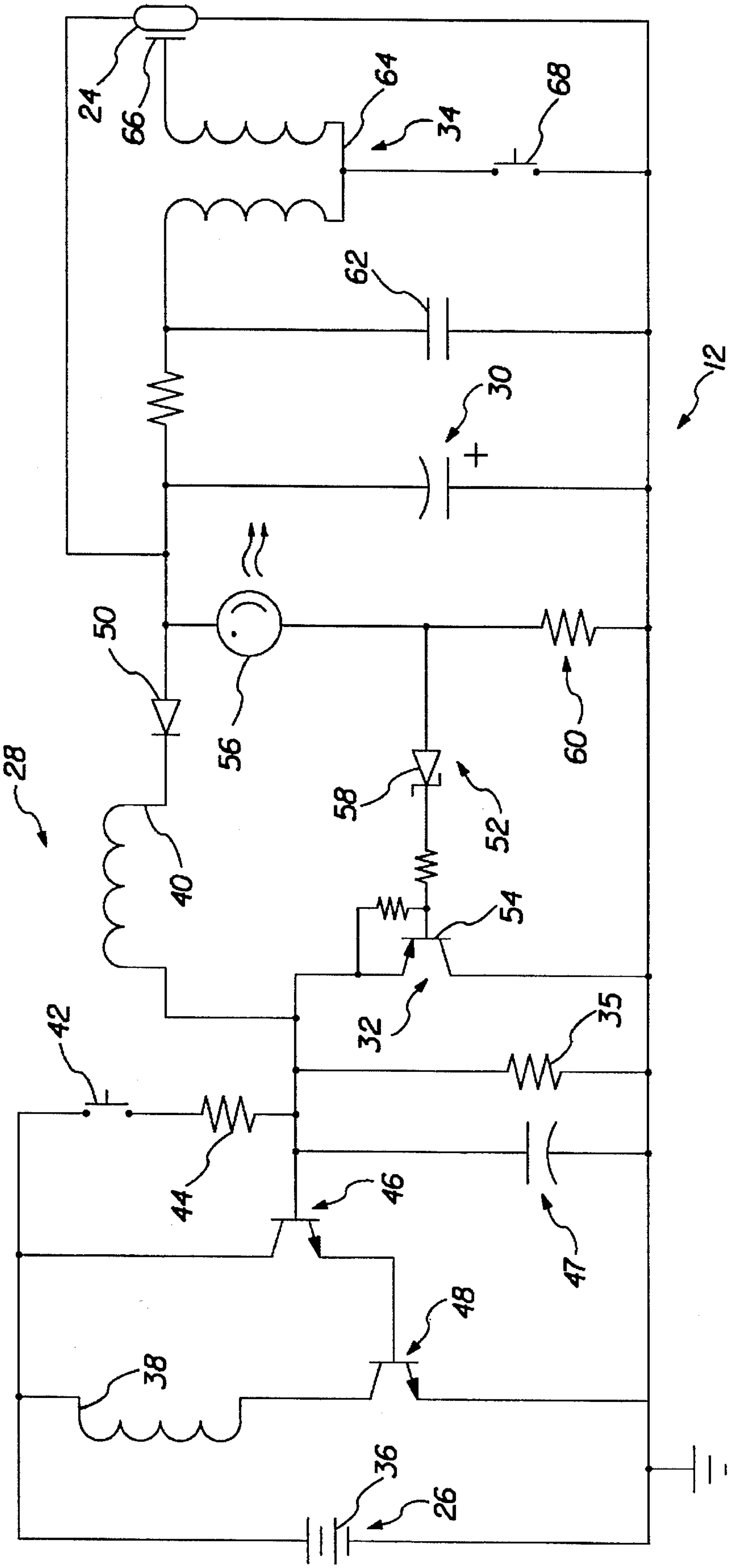
FIG. 1 is a schematic view of a flash charging and control circuit in accordance with a first embodiment of the invention.
Figure 2:
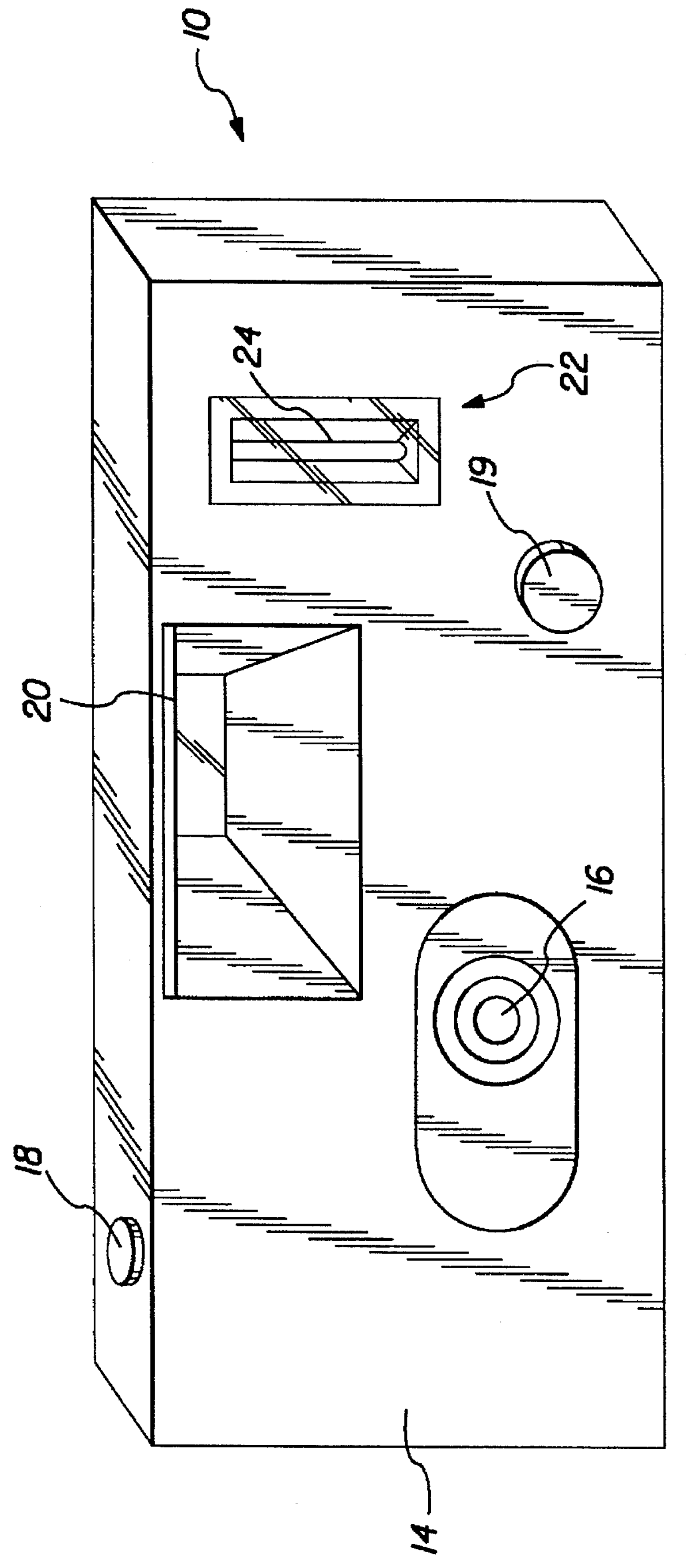
FIG. 2 is a is a perspective view of a camera including the flash charging and control circuit of FIG. 1.

Referring now to the drawings, a first embodiment of the invention is depicted in an inexpensive, single use camera 10 (FIG. 2) with a flash charging and control circuit 12 (FIG. 1). The camera includes a body 14, an optical system 16, two actuating mechanisms 18 and 19, a viewfinder 20 and a flash device 22 including a flash tube 24. The camera body 14 is adapted to receive and locate photographic film in a predetermined exposure position relative to the other camera components. Actuating mechanism 18 initiates a sequence which exposes the film through optical system 16 with supplemental illumination from flash device 22. Activating mechanism 19 initiates a flash charging cycle prior to the exposure sequence. The camera is pointed at the intended subject with the aid of viewfinder 20.

Operation of the flash device 22 is selected by the user, when needed, by momentary depression of a separate activating mechanism 19. Other approaches might be employed, however, including flash actuation with every exposure, which is typical of some single use cameras that have few and inexpensive components. Also included within the scope of the invention are single multi-stage actuation buttons and switches for sequentially initiating the charging and exposure cycles.

The flash charging and control circuit 12 includes a direct current power source 26, a self-oscillating flash charging circuit 28, a charge storage device in the form of a capacitor 30, an oscillation arresting circuit 32, a flash trigger circuit 34, a resistor 35 and the flash tube 24.

Power source 26 includes one or more batteries 36 of predetermined voltage, supplied with the camera in this preferred embodiment and without provision for replacement.

The self-oscillating charging circuit 28 includes a voltage converting transformer having primary and secondary windings 38 and 40, respectively; a momentary switch 42, for initiating oscillations in the circuit 28; a resister 44 in series with the momentary switch; ganged transistors 46 and 48, acting as switching elements for supporting and maintaining the oscillations; and a diode 50 for rectifying current induced in the secondary windings 40 of the transformer.

Charging is initiated by momentary depression of activating mechanism 19 which closes the momentary switch 42, thereby establishing current flow through resistor 44, transistors 46 and 48 and primary transformer winding 38. The switch 42 connects the base of transistor 46 to battery 26 through resister 44. Current flowing from the battery into the base of transistor 46 is multiplied by a transistor gain of fifty (50) and flows to the base of transistor 48. The current is multiplied again at transistor 48, with a gain of two hundred (200), and flows through the collector of transistor 48 and transformer primary winding 38. As the current flow builds in primary winding 38, it induces current flow in secondary winding 40. Current flows out of capacitor 30, charging the capacitor, and into the base of transistor 46, providing positive feedback.

At some point the base feedback will no longer support increasing current and the process reverses. Reduced primary current results in less feedback current, which means less primary current, etc., completing the first micro cycle. The next micro cycle is started by noise in the base of transistor 46 caused by the changing field in secondary 40. Another micro cycle is started, and oscillations continue. Transistors 46 and 48 provide enough loop gain to sustain the oscillations whether momentary switch 42 is open or closed.

Oscillations in the primary transformer windings 38 induce current in the secondary windings 40. Capacitor 30 is charged by the current flow, which is in one direction through rectifying diode 50 toward transistor 46.

Oscillation arresting circuit 32 includes a voltage sensor 52 and a digital pnp transistor or gate 54. The voltage is sensed by a neon ready light 56 in series with a zener diode 58. The neon ready light begins conducting at two hundred seventy volts (270 v.), but the voltage drop across the ready light falls to two hundred and twenty volts (220 v.) when it is conducting. The zener diode breaks down and conducts at one hundred ten volts (110 v.). The voltage sensor 52, which includes the ready light 56 and zener diode 58 in series, begins conducting at three hundred thirty volts (330 v.), which also represents a predetermined or full charge desired on flash capacitor 30. As used in this specification, the term full charge on the flash capacitor is used to mean that charge or voltage desired for application to the flash when it is fired.

When the voltage across capacitor 30 reaches two hundred seventy volts (270 v.), neon ready light 56 begins to conduct, illuminating the ready light and informing the user there is sufficient charge on flash capacitor 30 to initiate the exposure sequence. The capacitor 30 is not fully charged, however, and charging continues until the charge on capacitor 30 reaches three hundred thirty volts (330 v). When the flash capacitor 30 is fully charged, zener diode 58 begins to conduct, applying current to the base of transistor 54, switching transistor 54 on, and grounding the self-oscillating charging circuit 28. Oscillations in the circuit are arrested, and charging stops.

The neon ready light serves several functions. It conducts when the flash capacitor voltage exceeds a ready voltage to indicate when there is sufficient charge on the capacitor to initiate an exposure. It also serves as a component in a voltage sensing trigger circuit that stops charging of the flash capacitor when it reaches a predetermined or full voltage greater than the ready voltage. This permits the use of a zener diode rated for a lower voltage in the voltage sensing circuit without requiring any additional parts. The neon light is part of two electrical loops, each serving the different functions. The first loop includes the capacitor 30, the ready light 56 and resistor 60. This loop conducts continuously when the capacitor charge is above the ready charge, turning the ready light on. The second loop includes the capacitor 30, the ready light 56, the zener diode 58, and the transistor gate 54. This loop controls the charging circuit and conducts momentarily to trigger the charging circuit off when the capacitor charge reaches the predetermined or full charge. The momentary conduction momentarily increases the illumination of the ready light and thereby indicates when the predetermined charge is attained.

The voltage sensing circuit 52 is the neon ready light in series with the zener diode. Other components could be used, however, according to certain features of the invention. The neon light and zener diode act as a trigger for actuating transistor gate 54, and define a signal path between the flash capacitor 62 and the transistor 54. Other components that might be substituted for the diode and light include components that transmit signals by conducting electrons or transmitting photons.

Resistor 44, which is sized small enough to provide current to start the oscillations, is large enough for the digital transistor 54 to stop the oscillations even with momentary switch 42 still closed.

The flash triggering circuit 34, is used in commercially available single use cameras, and will not be described in detail. Briefly, the circuit 34 includes a triggering capacitor 62, a voltage converting transformer 64, a flash triggering electrode 66 and a synchronizing switch 68. Triggering capacitor 62 is charged by current flow through secondary winding 40 at the same time and in similar manor as flash capacitor 30. In operation, synchronizing switch 68 is closed by the camera shutter mechanism at the proper time in the exposure sequence. Capacitor 62 discharges through the primary windings of voltage converting transformer 64, inducing four thousand volts (4 kv.) in triggering electrode 66, and ionizing the gas in flash discharge tube 24. Flash capacitor 30 then discharges through the flash tube 24, exciting the gas and producing flash illumination.

It should now be apparent that an oscillation arresting device according to the present invention is coupled directly through a voltage sensor to the flash capacitor, and is not ratioed through inductive components or timed with capacitive circuits. Inexpensive components provide relatively precise charging control automatically to reduce undue battery drain and free the user for photographic composition. The phrase "direct coupling," as used in the present specification and claims, is intended to cover primarily resistive couplings, including neon lights and zener diodes, but excluding those that are primarily inductive or capacitive.

The flash charging cycle is reinitiated automatically by actuation of the flash device. Energy transitions in the flash triggering and discharge circuits 30, 34 and 62, acting through secondary winding 40, generate noise in the base of transistor 46. The feedback loop, including transistors 46 and 48, again provide enough loop gain to sustain the oscillations whether momentary switch 42 is open or closed. The self-oscillating charging cycle is restarted, and the oscillations continue as before.

A capacitor 47 provides filtering on the base of transistor 46 to keep the circuit from inadvertently turning on due to undesirable noise from, for example, battery bounce or the neon ready light 56 turning off. Capacitor 47 preferably has a value of 470 pico farads/50 volts in order that the afore-described feedback loop can overcome the effect of capacitor 47 to restart the self-oscillating charging cycle. In the illustrated and preferred circuit of FIG. 1, values of capacitor 47 might range from two hundred pico farads (200 pf) to one thousand pico farads (1000 pf). A value of six thousand eight hundred pico farads (6800 pf) was tried and is considered too high, according to this feature, because it prevents reinitiation of the charging sequence when the flash is fired.

Of course the capacitor 47 might have other values according to other aspects of the invention.

Resistor 35 is positioned between the base of transistor 46 and ground, and prevents the circuit from commencing charging when exposed to static electricity. Resistor 35 holds the base of transistor 46 at ground potential until switch 42 is momentarily closed. Static electricity that would otherwise flow through the junctions of transistors 46 and 48 now flows through resistor 35 and does not start the charger. In this embodiment, resistor 44 is about 10K ohm and resistor 35 is about 220K ohm. Resistor 35 preferably has a value of between about 180K ohm to about 300K ohm. As a result, the voltage divider of resistors 35 and 44 will forward bias both transistors 46 and 48 when switch 42 is momentarily closed. The presence of resistor 35 greatly reduces the likelihood of the charger starting from static electricity.

Although resistor 35 solves the static electricity problem, it does cause a small problem in the circuit. If capacitor 30 is fully charged to 330 volts and then the camera is left idle for two hours, the charge on capacitor 30 will decrease to about 200–240 volts. Under this condition, with resistor 35 in the circuit, the camera may or may not flash when the shutter button is pressed. Also, if the camera does flash, there may not be an associated auto-restart (see above) because resistor 35 absorbs the smaller-than-normal amount of radiated energy from the flash.

Figure 3:
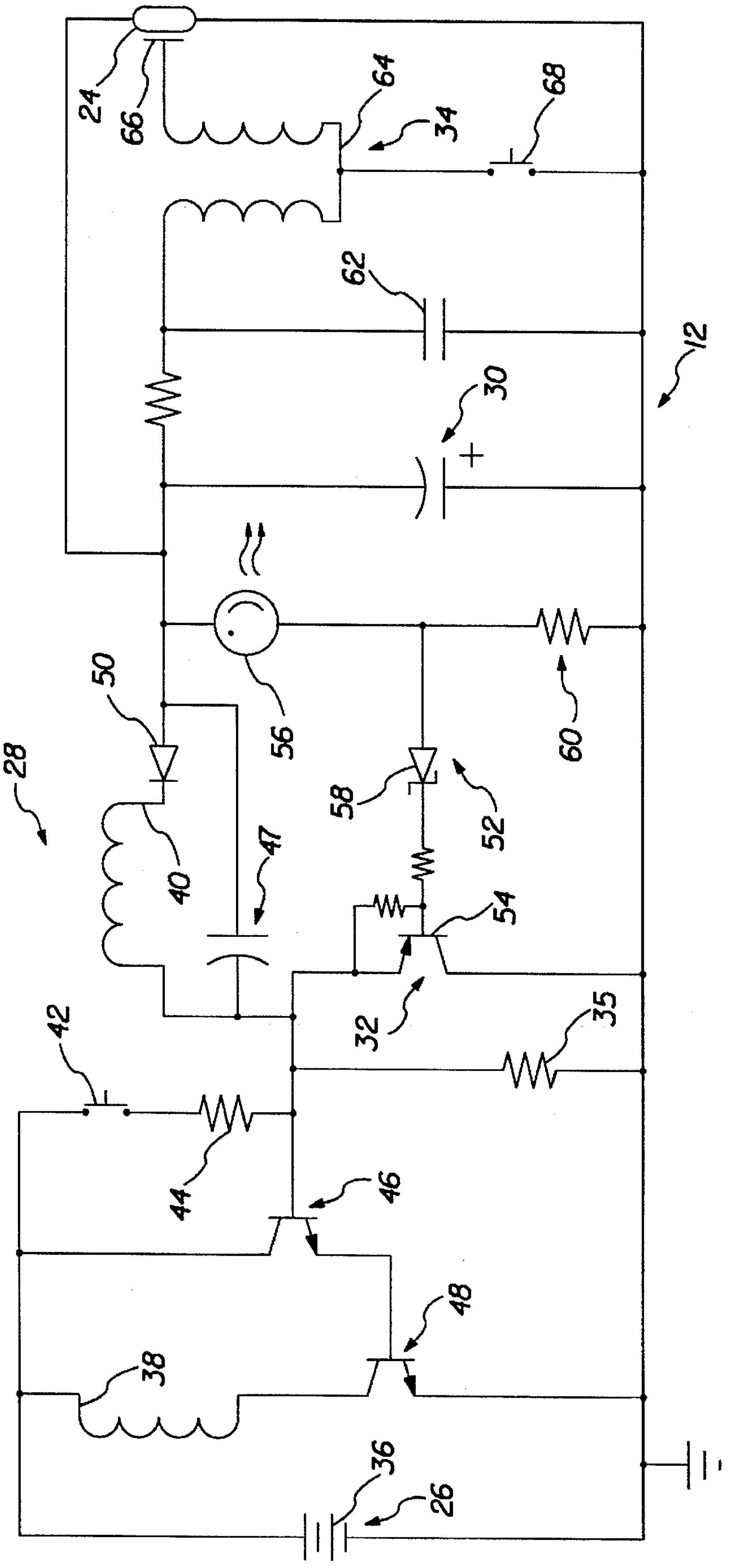
FIG. 3 is a schematic view of a flash charging and control circuit in accordance with a second embodiment of the invention.

The solution to the problems described in the previous paragraph will be described with reference to FIG. 3. These problems are solved by disconnecting one side of capacitor 47 from ground and reconnecting this side to the negative terminal of capacitor 30. When capacitor 30 discharges to actuate flash tube 24, the negative terminal of capacitor 30 rapidly becomes less negative (goes positive). This positive going impulse is coupled into the base of transistor 46 via capacitor 47 and insures auto-restarting. In FIG. 3, capacitor 47 has a value of 470 pf/350 volts. Capacitor 47 preferably has a value of between about two hundred pico farads (200 pf) to one thousand pico farads (1000 pf). Resistor 35 preferably has a value of between about 100K ohm to about 300K ohm.

While the invention is described in connection with a preferred embodiment, other modifications and applications will occur to those skilled in the art. The claims should by interpreted to fairly cover all such modifications and applications within the true spirit and scope of the invention.

PARTS LIST FOR FIGS. 1–3

10—Camera.
12—Flash charging and control circuit.
14—Camera body.
16—Optical system.
18,19—Actuating mechanisms.
20—Viewfinder.
22—Flash device.
24—Flash tube.
26—Power source.

28—Self-oscillating flash charging circuit.
30—Capacitor.
32—Oscillation arresting circuit.
34—Flash trigger circuit.
35—Resistor
36—Batteries.
38—Primary transformer winding.
40—Secondary transformer winding.
42—Momentary switch.
44—Resistor.
46—Transistor.
47—Capacitor.
48—Transistor.
50—Rectifying diode.
52—Voltage sensor.
54—Digital transistor.
56—Neon ready light.
58—Zener diode.
62—Triggering capacitor.
64—Transformer.
66—Flash triggering electrode.
68—Synchronizing switch.

What is claimed is:

1. An electronic flash device including an illumination element, an actuation circuit having a flash capacitor providing energy releasable to illuminate said element, and a self-oscillating charging circuit, having a transistor, for charging said capacitor, is characterized by:

a resistor located between a base of the transistor and ground for preventing the self-oscillating circuit from charging the capacitor when the flash device is exposed to a static electric charge.

2. The flash device of claim 1, wherein the resistor has a value in the range of between about 180K ohms to about 300K ohms.

3. The flash device of claim 1, further including a feedback loop which reinitiates oscillations in the charging circuit in response to energy being released by the flash capacitor, and an additional capacitor located between the base of the transistor and a terminal of the flash capacitor for enabling reinitiation of oscillation in the charging circuit when the charge on the flash capacitor has decreased to less than a fully charged level prior to discharging the flash capacitor to illuminate the element.

4. The flash device of claim 3, wherein the resistor has a value in the range of between about 100K ohms to about 300K ohms.

5. The flash device of claim 3, wherein the value of the additional capacitor has a value in the range of between about 200–1000 picofarads.

6. The flash device of claim 3, wherein the self-oscillating charging circuit includes a transformer having primary and secondary windings, and the feedback loop includes the secondary windings and an amplification element between the secondary windings and the primary windings.

* * * * *